US012596025B2

(12) United States Patent
Heiss et al.

(10) Patent No.: US 12,596,025 B2
(45) Date of Patent: Apr. 7, 2026

(54) AIR MASS SENSOR

(71) Applicant: Vitesco Technologies GmbH, Regensburg (DE)

(72) Inventors: Marion Heiss, Munich (DE); Andreas Meyer, Zell (DE); Holger Weininger, Painten (DE); Martin Lesser, Landshut (DE); Thomas Millies, Regensburg (DE); Radim Sotkovsky, Frydek-Mistek (CZ); Petr Kusyn, Hlucin (CZ)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 283 days.

(21) Appl. No.: 18/552,598

(22) PCT Filed: Mar. 17, 2022

(86) PCT No.: PCT/EP2022/056975
§ 371 (c)(1),
(2) Date: Sep. 26, 2023

(87) PCT Pub. No.: WO2022/207338
PCT Pub. Date: Oct. 6, 2022

(65) Prior Publication Data
US 2024/0183699 A1 Jun. 6, 2024

(30) Foreign Application Priority Data
Mar. 30, 2021 (DE) .................... 10 2021 203 217.6

(51) Int. Cl.
*G01F 1/68* (2006.01)
*G01F 1/688* (2006.01)
*G01F 15/14* (2006.01)

(52) U.S. Cl.
CPC .............. *G01F 1/688* (2013.01); *G01F 15/14* (2013.01)

(58) Field of Classification Search
CPC ........ G01F 1/688; G01F 15/14; G01F 1/6842; G01F 15/00; G01F 5/00
See application file for complete search history.

(56) References Cited

U.S. PATENT DOCUMENTS

| | | | |
|---|---|---|---|
| 7,809,473 B2 * | 10/2010 | Shajii ................... | G05D 7/0635 |
| | | | 137/487 |
| 8,763,452 B2 | 7/2014 | Doi et al. ................... | 73/204.11 |

(Continued)

FOREIGN PATENT DOCUMENTS

| | | | |
|---|---|---|---|
| DE | 195 42 126 | 5/1997 | ............. G01F 1/692 |
| DE | 102004021304 A1 | 11/2005 | ............... G01F 1/68 |

(Continued)

OTHER PUBLICATIONS

German Office Action, Application No. 102021203217.6, 6 pages, Nov. 22, 2021.

(Continued)

*Primary Examiner* — Francis C Gray
(74) *Attorney, Agent, or Firm* — Slayden Grubert Beard PLLC

(57) ABSTRACT

Various embodiments of the teachings herein include an air mass sensor for determining an air mass flow rate. The sensor may include: a housing defining an electronics chamber; and sensor electronics at least partly located in the electronics chamber. The housing defines a duct providing passage for a gas to flow through the housing. The housing defines an opening connecting the duct and the electronics chamber. The electronics chamber forms a pressure compensation volume for the duct.

11 Claims, 10 Drawing Sheets

(56) References Cited

U.S. PATENT DOCUMENTS

| | | | |
|---|---|---|---|
| 8,893,567 B2 | 11/2014 | Kurth et al. | ................. 73/866.5 |
| 9,587,970 B2 | 3/2017 | Morino et al. | ............. 73/204.18 |
| 10,612,955 B2 | 4/2020 | Akagi et al. | |
| 11,143,535 B2 | 10/2021 | Uenodan et al. | |
| 11,353,350 B2 | 6/2022 | Uenodan et al. | |
| 11,493,232 B2 | 11/2022 | Sugawara et al. | |
| 2002/0029629 A1 | 3/2002 | Uramachi | ................. 73/204.22 |
| 2003/0236643 A1* | 12/2003 | Shajii | ...................... G01F 1/684 |
| | | | 702/100 |
| 2013/0061684 A1* | 3/2013 | Frauenholz | ............. G01F 15/12 |
| | | | 73/861 |
| 2016/0252912 A1* | 9/2016 | Horwitz | ................... G01F 1/88 |
| | | | 137/2 |
| 2018/0372521 A1* | 12/2018 | Millies | .................. G01F 1/6845 |
| 2020/0363247 A1 | 11/2020 | Ishitsuka et al. | |

FOREIGN PATENT DOCUMENTS

| | | | | |
|---|---|---|---|---|
| DE | 199 64 452 | 12/2009 | ............. | G01F 1/692 |
| DE | 102017204041 A1 | 9/2018 | ............. | F02D 41/18 |
| DE | 10 2017 218893 | 4/2019 | ............. | G01F 1/696 |
| DE | 112018003394 T5 | 3/2020 | ............. | G01F 1/684 |
| DE | 102018219729 A1 | 5/2020 | ............. | F02D 41/02 |
| JP | 6672391 B2 | 3/2020 | ............... | E04B 1/82 |
| JP | 2014071032 A | 4/2024 | ............. | G01F 1/684 |
| WO | 2010/031629 A1 | 3/2010 | ............. | G01F 1/684 |
| WO | 2019/049513 A1 | 3/2019 | ............. | G01F 1/684 |

OTHER PUBLICATIONS

Search Report for International Application No. PCT/EP2022/056975, 5 pages, Jul. 12, 2022.

Japanese Office Action, Application No. 2023560754, 3 pages, Oct. 24, 2024.

* cited by examiner

AIR MASS SENSOR

CROSS-REFERENCE TO RELATED APPLICATIONS

This application is a U.S. National Stage Application of International Application No. PCT/EP2022/056975 filed Mar. 17, 2022, which designates the United States of America, and claims priority to DE Application No. 10 2021 203 217.6 filed Mar. 30, 2021, the contents of which are hereby incorporated by reference in their entirety.

TECHNICAL FIELD

The present disclosure relates to sensors. Various embodiments include air mass sensors for determining an air mass flow and/or motor vehicles comprising an air mass sensor.

BACKGROUND

An example air mass sensor is described in documents U.S. Pat. No. 8,763,452 B2 and DE 10 2018 219 729 A1. Such an air mass sensor can be used, for example, to determine an air mass flow in an intake duct of an internal combustion engine of a motor vehicle. In this case, oscillation excitations can occur in the range of the natural frequencies of the duct and compromise the measurement result. For example, an exhaust gas turbocharger can cause high-frequency pressure pulsations of up to 20 kHz in the air mass flow to be measured. For certain excitation frequencies or excitation frequency ranges, there may thus be large deviations between the measured air mass flow and the actual air mass flow. These deviations can have a detrimental effect on engine operation.

SUMMARY

The teachings of the present disclosure address the technical problem of specifying an improved air mass sensor which, in particular, is more robust with respect to vibration excitations from exhaust gas turbochargers. For example, some embodiments include an air mass sensor for determining an air mass flow rate, comprising a housing (4) and comprising sensor electronics (6), wherein the sensor electronics (6) is at least partly located in an electronics chamber (8) of the housing (4), wherein the housing (4) has a duct (14) for passing through the housing (4) an air mass flow (L) to be measured, characterized in that the duct (14) and the electronics chamber (8) are connected to each other via an opening (26), wherein the electronics chamber (8) forms a pressure compensation volume for the duct (14).

In some embodiments, a free volume of the electronics chamber (8) provided for pressure compensation is more than 0.5 cm3 and less than 20 cm3, in particular, is more than 1 cm3 and less than 10 cm3.

In some embodiments, the opening (26) has a gap at least in portions and the gap has, in particular, a height (H1) selected from a range between 0.02 mm and 0.3 mm inclusive, in particular has a height (H1) selected from a range between 0.05 mm and 0.1 mm inclusive.

In some embodiments, the opening (26) has, at least in portions, a polygonal cross-section, in particular a rectangular or triangular cross-section and/or the opening (26) has, at least in portions, a circular or arcuate cross-section.

In some embodiments, the opening (26) has, at least in portions, a height (H1, H2) selected from a range between 0.02 mm and 3 mm inclusive, further in particular a height (H1, H2) selected from a range between 0.05 mm and 1 mm inclusive and/or the opening (26) has, at least in portions, a width (B1, B2) selected from a range between 0.5 mm and 10 mm inclusive, further in particular a width (B1, B2) selected from a range between 1 mm and 5 mm inclusive.

In some embodiments, the air mass sensor (2) is set up to measure one or more of the parameters listed below: pressure of the air mass flow; humidity of the air mass flow, temperature of the air mass flow.

In some embodiments, the measuring element (24) of the sensor electronics is a thermal measuring element (24), in particular a hot film air mass measuring element (24).

In some embodiments, the opening (26) is arranged at least in portions downstream of a measuring element (24) of the sensor electronics (6) and/or the opening (26) is arranged at least in portions upstream of a measuring element (24) of the sensor electronics (8) and/or the opening (26) is arranged at least in portions at the level of a measuring element (24) of the sensor electronics (8).

In some embodiments, the opening (26, 26.1, 26.2, 26.3) has a distance (D1) to a measuring element (24) of the sensor electronics (6), wherein the distance is less than 10 mm, in particular less than 5 mm, in particular less than 4 mm and/or the opening (26, 26.1, 26.2, 26.3), the height (H2) of which is greater than its width (B2), at least in portions, has a distance (D1) to a measuring element (24) of the sensor electronics (6), wherein the distance (D1) is less than 10 mm, in particular less than 5 mm, in particular less than 4 mm and/or the opening (26, 26.1, 26.2, 26.3), the height (H2) of which is greater than its width (B2) at least in portions, has a distance (D1) to a measuring element (24) of the sensor electronics (6), wherein the distance (D1) corresponds at most to ten times, in particular at most to five times, the width of the opening.

As another example, some embodiments include a motor vehicle characterized by an air mass sensor (2) as described herein.

In some embodiments, the motor vehicle comprises an internal combustion engine (110), characterized in that the air mass sensor (2) is arranged in an intake line of the internal combustion engine (110) to measure an air mass flow (L) within the intake line (120).

BRIEF DESCRIPTION OF THE DRAWINGS

The teachings herein are described in greater detail below with reference to a drawing illustrating exemplary embodiments. In the FIGURES, in each case highly schematically:

FIG. 4A shows a further embodiment of a cross-section of an air mass sensor incorporating teachings of the present disclosure;

FIG. 4B shows a further embodiment of a cross-section of an air mass sensor incorporating teachings of the present disclosure;

FIG. 4C shows a further embodiment of a cross-section of an air mass sensor incorporating teachings of the present disclosure;

FIG. 9A shows a further embodiment of a cross-section of an air mass sensor incorporating teachings of the present disclosure;

FIG. 9B shows a further embodiment of a cross-section of an air mass sensor incorporating teachings of the present disclosure;

FIG. 9C shows a further embodiment of a cross-section of an air mass sensor incorporating teachings of the present disclosure.

DETAILED DESCRIPTION

Figure 1:
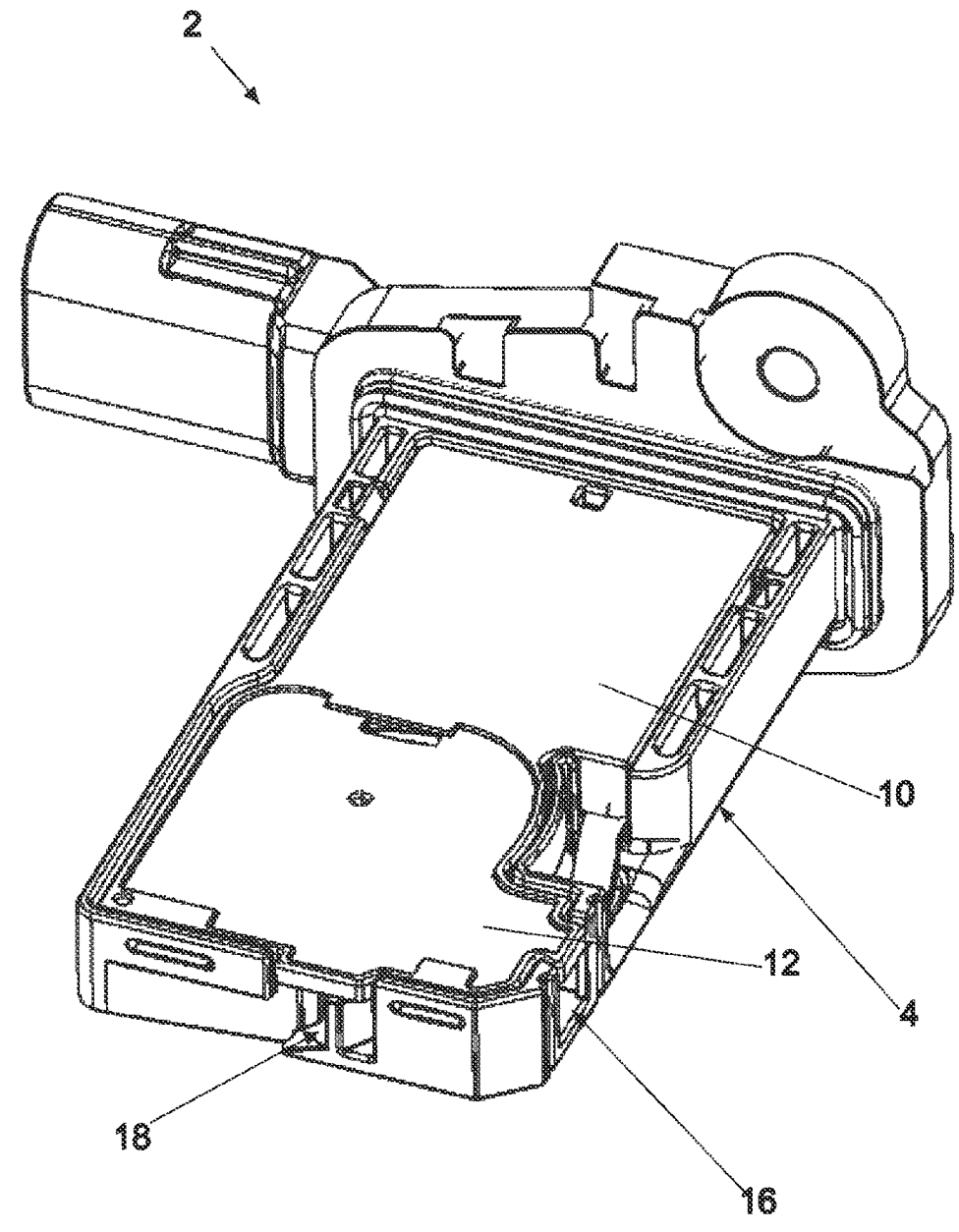
FIG. 1 shows a perspective view from above of an air mass sensor incorporating teachings of the present disclosure.

Some embodiments of the teachings herein include an air mass sensor for determining an air mass flow, comprising a housing and sensor electronics, wherein the sensor electronics is at least partly located in an electronics chamber of the housing, and wherein the housing has a duct for guiding an air mass flow to be measured through the housing. The duct and the electronics chamber are connected to each other via an opening, wherein the electronics chamber forms a pressure compensation volume for the duct.

The opening therefore enables a fluid connection between the duct and the electronics chamber, so that part of the air mass flow to be measured can flow out of the duct into the electronics chamber. In this way, the amplitude of oscillation excitations due to high-frequency pressure pulsations of turbochargers can be reduced so that reliable measurement can also take place for critical excitation frequencies. In particular, natural frequencies of the duct can be eliminated in this way or a respective oscillation response in the range of one or more natural frequencies can be reduced.

In some embodiments, components of the sensor electronics arranged in the electronics chamber are at least partially or completely encapsulated in a potting compound or encased by a potting compound in order to protect the components of the sensor electronics from environmental influences, in the present case in particular to protect them against the air mass flow to be measured.

In some embodiments, a free volume of the electronics chamber provided for pressure compensation is more than 0.5 cm3 and is less than 20 cm3, in particular is more than 1 cm3 and is less than 10 cm3.

The electronics chamber and the duct may each be covered by a cover or lid of the housing. The opening can be at least partially incorporated in the cover of the electronics chamber and/or delimited by the cover of the electronics chamber.

The opening can have a gap or consist of a gap. If reference is made here to a gap, its width may be at least five times its height, in particular at least ten times its height. The gap is therefore an elongate, flat opening.

The gap may have a height selected from a range between 0.02 mm to 0.3 mm inclusive, in particular a height selected from a range between 0.05 mm to 0.1 mm inclusive.

The gap may have a width selected from a range between 0.1 mm and 10 mm inclusive, further particularly having a width selected from a range between 1 mm and 5 mm inclusive.

At least portions of the opening can have a polygonal cross-section, in particular a rectangular or triangular cross-section.

In some embodiments, the opening can have a circular or arcuate cross-section, at least in portions.

The opening can have, at least in portions, a height selected from a range between 0.02 mm and 3 mm inclusive, in particular a height selected from a range between 0.05 mm to 1 mm inclusive.

In some embodiments, the opening can have, at least in portions, a width selected from a range between 0.5 mm and 10 mm inclusive, in particular a width selected from a range between 1 mm and 5 mm inclusive.

The opening can have a gap and/or one or more portions of polygonal and/or circular or arcuate cross-section. The portions can be through-openings, grooves, chamfers, holes or the like provided on a cover or a lid.

The opening can be segmented and, in particular, formed from a plurality of through-openings connecting the duct to the electronics chamber.

The opening can have an air-permeable filter or an air-permeable membrane to prevent contaminants, such as dust, oil and/or soot particles, from entering the electronics chamber. In particular, the filter can be replaceably held on the housing and/or integrated into a cover or lid of the electronics chamber.

The air mass sensor can have supplementary functions in addition to measuring an air mass flow. For example, in addition to measuring an air mass flow rate, the air mass sensor can be set up to measure one or more of the parameters listed below: pressure of the air mass flow; humidity of the air mass flow; temperature of the air mass flow.

A measuring element of the sensor electronics of the air mass sensor can be a thermal measuring element, in particular a hot-film air mass measuring element. Such a hot-film air-mass measuring element can, for example, have at least one heating element and two temperature sensors which are passed over by the air mass flow, wherein the magnitude of the air mass flow can be derived from the measured temperatures or the temperature profiles of the temperature sensors, which differ from one another. Such a hot-film air mass measuring element is described, for example, in DE 10 2018 219 729 A1.

In some embodiments, the opening is arranged at least in portions downstream of a measuring element of the sensor electronics. "Downstream" means that the air mass flow in the duct, viewed in the flow direction, first flows along the measuring element and then along the opening, or the opening is downstream of the measuring element, viewed in the flow direction.

In some embodiments, the opening is arranged at least in portions upstream of a measuring element of the sensor electronics. "Upstream" means that the air mass flow in the duct, viewed in the flow direction, first flows along the opening and then along the measuring element, or the opening is upstream of the measuring element, viewed in the flow direction.

In some embodiments, the opening is arranged at least in portions at the level of a measuring element of the sensor electronics. "At the level of" means that the air mass flow in the duct, viewed in the flow direction, flows simultaneously along the opening and along the measuring element. In other words, the opening and the measuring element lie in one plane, at least in portions, when viewed in a section transverse to the flow direction.

In some embodiments, the duct has a measuring channel and a bypass or bypass channel, wherein the measuring channel guides part of an air mass flow entering the duct to a measuring point of the sensor electronics, and wherein the bypass channel branches off part of the air mass flow entering the duct before reaching the measuring point and discharges it from the housing.

In some embodiments, a first wall element, which separates the bypass channel and the measuring channel from one another at least in portions, has a wall height which is reduced at least in portions, so that a flow can pass over the first wall element at least in portions, and/or has a through-opening, so that a flow can pass through the first wall element. In some embodiments, the air mass sensor has a second wall element, which separates the bypass channel and an inlet of the duct from one another at least in portions, has a wall height which is reduced at least in portions, so that a flow can pass over the second wall element at least in portions, and/or has a through-opening, so that a flow can pass through the second wall element.

The reduced wall height and/or the through-opening therefore allow an additional fluid connection within the duct to provide an additional pressure compensation for the measuring channel. Also in this way, in particular, the amplitude of oscillation excitations due to high-frequency pressure pulsations of turbochargers can be reduced so that reliable measurement can also take place for critical excitation frequencies. In particular, natural frequencies of the duct can also be eliminated in this way or a respective oscillation response in the range of one or more natural frequencies can be reduced.

In some embodiments, the housing has, in addition to an inlet opening and an outlet opening of the duct, and in addition to the bypass channel, at least one compensation opening which connects the duct to surroundings of the housing. The compensation opening therefore enables a fluid connection between the duct and the surroundings of the housing, so that part of the air mass flow to be measured can flow out of the duct into the surroundings of the housing to create an additional pressure compensation. Also in this way, in particular, the amplitude of oscillation excitations due to high-frequency pressure pulsations of turbochargers can be reduced so that reliable measurement can also take place for critical excitation frequencies. In particular, natural frequencies of the duct can also be eliminated in this way or a respective oscillation response in the range of one or more natural frequencies can be reduced.

Exactly one compensation opening or two or more compensation openings can be provided.

In some embodiments, the surroundings of the housing can be an interior of a pipe, conduit, or the like, within which the air mass sensor is disposed for determining the air mass flow rate.

The compensation opening can be a through-opening, such as a hole or the like made in a wall of the housing.

In some embodiments, the compensation opening can be formed between housing parts of the housing. Insofar as the housing has, for example, a first housing part and a second housing part which are assembled to form the housing, the compensation opening can be a recess in the region of a seam or joining edge in the region of which the first and second housing parts form-fittingly engage in one another and/or are connected to one another.

The first housing part can be, for example, a lid or a cover. The second housing part can be a main body of the housing to which the cover is attached.

The housing parts can be connected to each other by means of an adhesive, wherein the compensation opening at least partially borders an adhesive connecting the housing parts.

In some embodiments, the compensation opening is part of an interrupted adhesive seam or part of an interrupted adhesive bead. The compensation opening can therefore be an interruption of an adhesive seam or adhesive bead that joins the housing parts together. In particular, the adhesive seam or adhesive bead forms an adhesive connection between the housing parts and also forms a seal between the duct and the surroundings, wherein the seal is interrupted locally to form the compensation opening.

In some embodiments, the opening has a distance to a measuring element of the sensor electronics, wherein the distance is less than 10 mm, in particular less than 5 mm, in particular less than 4 mm.

In some embodiments, the opening, the height of which is greater than its width at least in portions, has a distance to a measuring element of the sensor electronics, wherein the distance is less than 10 mm, in particular less than 5 mm, in particular less than 4 mm.

In some embodiments, the opening, the height of which is greater than its width at least in portions, has a distance to a measuring element of the sensor electronics, wherein the distance is at most ten times, in particular at most five times, the width of the opening.

In some embodiments, a motor vehicle can have an internal combustion engine, with an air mass sensor incorporating the teachings of the present disclosure arranged in an intake line of the internal combustion engine to measure an air mass flow within the intake line. The internal combustion engine can have one or more turbochargers.

Figure 2:
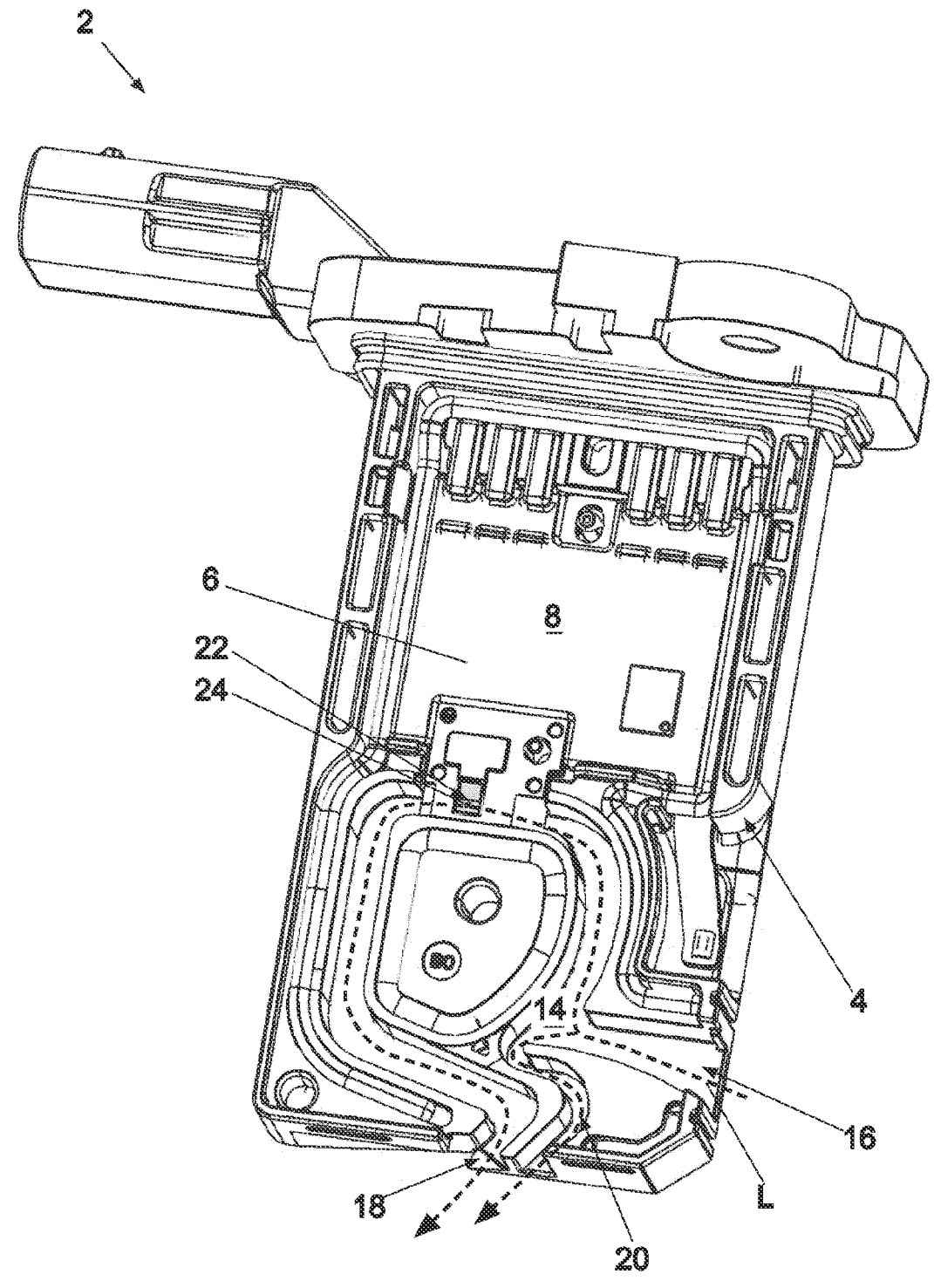
FIG. 2 shows the air mass sensor from FIG. 1 without covers.

FIG. 1 shows an air mass sensor 2 incorporating teachings of the present disclosure for determining an air mass flow. The air mass sensor 2 has a housing 4. The air mass sensor 2 has sensor electronics 6, wherein the sensor electronics 6 is located in an electronics chamber 8 of the housing 4 (FIG. 2). To illustrate the electronics chamber 8 and the sensor electronics 6, covers 10, 12 or lids 10, 12 of the housing 4 are hidden in FIG. 2.

The housing 4 has a duct 14 for passing through the housing 4 an air mass flow L to be measured. The duct 14 has an inlet opening 16 for introducing the air mass flow L into the housing 4. The duct 14 has an outlet opening 18 for discharging the air mass flow L from the housing 4.

The duct 14 has a bypass 20, so that part of the air mass flow L does not flow to a measuring point 22 of the air mass sensor 2, but is branched off before the measuring point 22 and is led out of the housing 4 again.

A measuring element 24 of the sensor electronics 6 is arranged in the region of the measuring point 22. The measuring element 24 is a thermal measuring element 24—in this case a hot-film air mass measuring element 24.

The duct 14 and the electronics chamber 8 are connected to each other via an opening 26 (FIG. 3), wherein the electronics chamber 8 forms a pressure compensation volume for the duct 14. In other words, there is a fluid connection between the electronics chamber 8 and the duct 14 so that air of the air mass flow L can flow from the duct 14 into the electronics chamber 8 and can flow from the electronics chamber 8 into the duct 14.

A free volume of the electronics chamber 8 provided for pressure compensation and not occupied by the sensor electronics 6 is more than 0.5 cm3 and less than 20 cm3.

Figure 3:
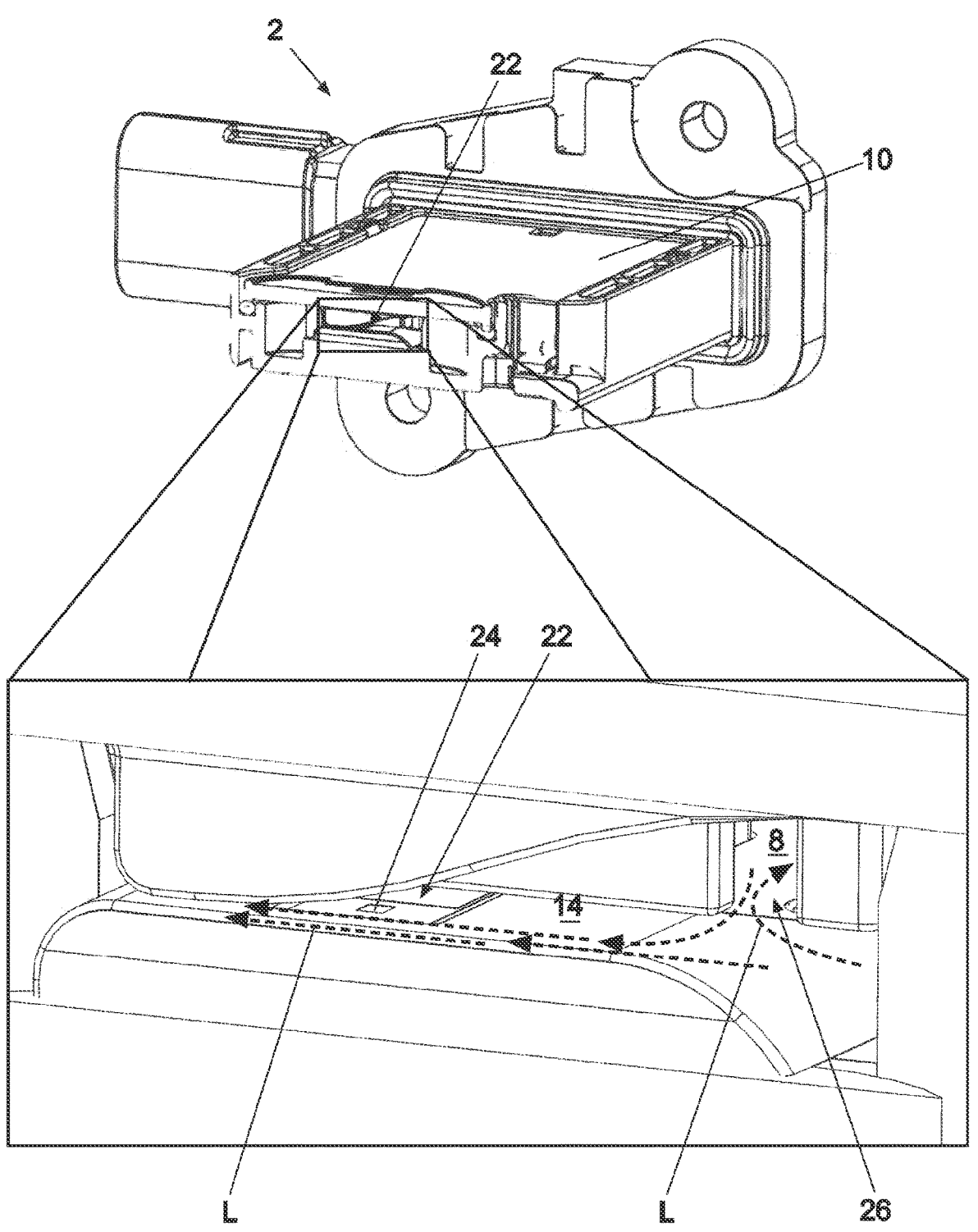
FIG. 3 shows a cross-section of the air mass sensor from FIG. 1 with an enlarged detail of this cross-section.

According to FIG. 3, the opening 26 is arranged upstream of the measuring element 24 of the sensor electronics 6.

In the following, some variants for the constructive design of the opening 26 are described by way of example. FIGS. 4A-9C each show schematic cross-sections of embodiments of air mass sensors 2, analogous to the cross-section shown in FIG. 3. Here, the measuring element 24 is arranged on a circuit board 28, which is supported by a base plate 30. Furthermore, the cover 10 of the housing 4 and the housing 4 itself are shown.

Figures 4A, 4B, 4C:
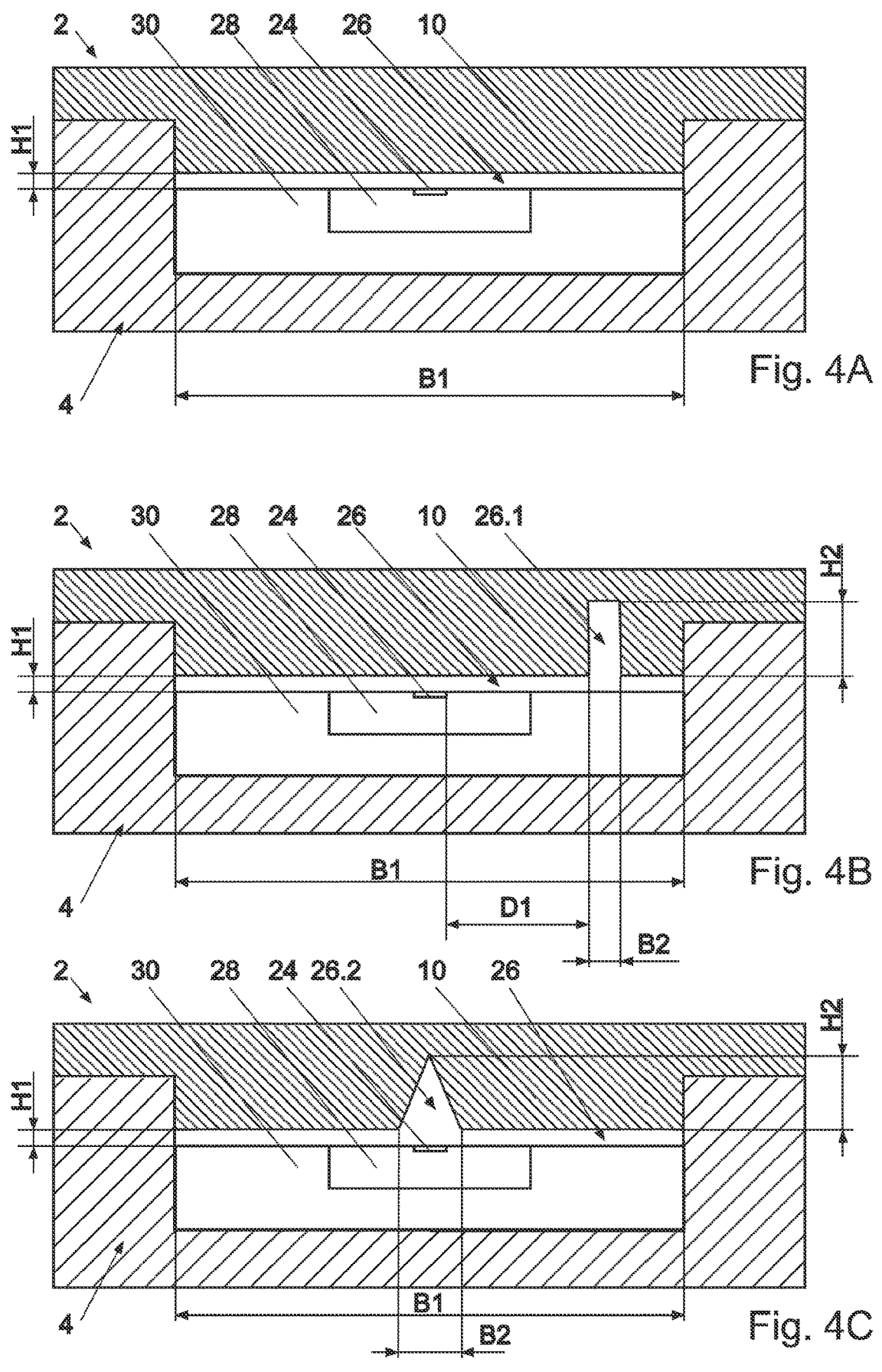

The opening 26 can be a gap 26, which has a height H1 and a width B1 (FIG. 4A). According to FIG. 4A, the gap 26 has a height H1 of 0.1 mm. In some embodiments, the gap 26 has, for example, a height H1 between 0.05 mm and 0.2 mm. In the present case, the gap 26 has a constant height H1 when viewed over the entire width B1. The width B1 can be up to 10 mm.

As shown in FIG. 4B, the opening 26 may have a height H1 in portions and may have a height H2 in portions that is greater than the height H1. For example, the height H2 may be up to 3 mm or up to 2 mm, wherein a width B2 may be, for example, up to 0.3 mm, up to 0.2 mm, or up to 0.1 mm. The opening 26 may locally have, for example, a rectangular through-opening 26.1 (FIG. 4B) or a triangular through-opening 26.2 (FIG. 4C). Such a through-opening 26.1, 26.2 or groove 26.1, 26.2 can be provided in the cover 10.

The through-opening 26.1 of the opening 26 has a height H2 which is greater than its width B2. The through-opening 26.1 has a distance D1 to the measuring element 24 that corresponds to less than a tenth of the width B2 of the through-opening 26.1, wherein the distance D1 is less than 10 mm in the present case.

Figures 5A, 5B, 5C:
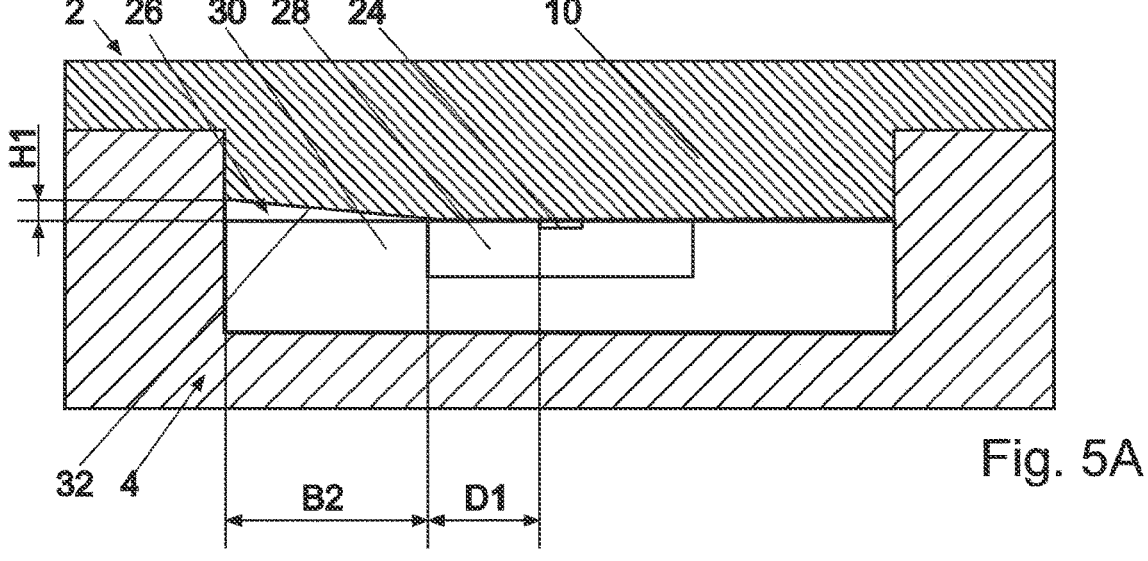
FIG. 5A shows a further embodiment of a cross-section of an air mass sensor incorporating teachings of the present disclosure.
FIG. 5B shows a further embodiment of a cross-section of an air mass sensor incorporating teachings of the present disclosure.
FIG. 5C shows a further embodiment of a cross-section of an air mass sensor incorporating teachings of the present disclosure.

According to FIG. 5A, the cover 10, downstream of the measuring element 24, has a chamfer 32 of height H1 and width B2 which delimits the opening 26. The opening 26 has a distance D1 from the measuring element 24 that is less than 5 mm.

Such a chamfer 32 can be combined with a continuous gap, as FIG. 5B shows. The beginning of the chamfer 32 has a distance D1 to the measuring element 24 which is smaller than 5 mm.

FIG. 5C shows a chamfer 32 upstream of the measuring element 24. The opening 26 formed by the chamfer 26 has a distance D1 to the measuring element 24 that is less than 5 mm.

Figure 6A:
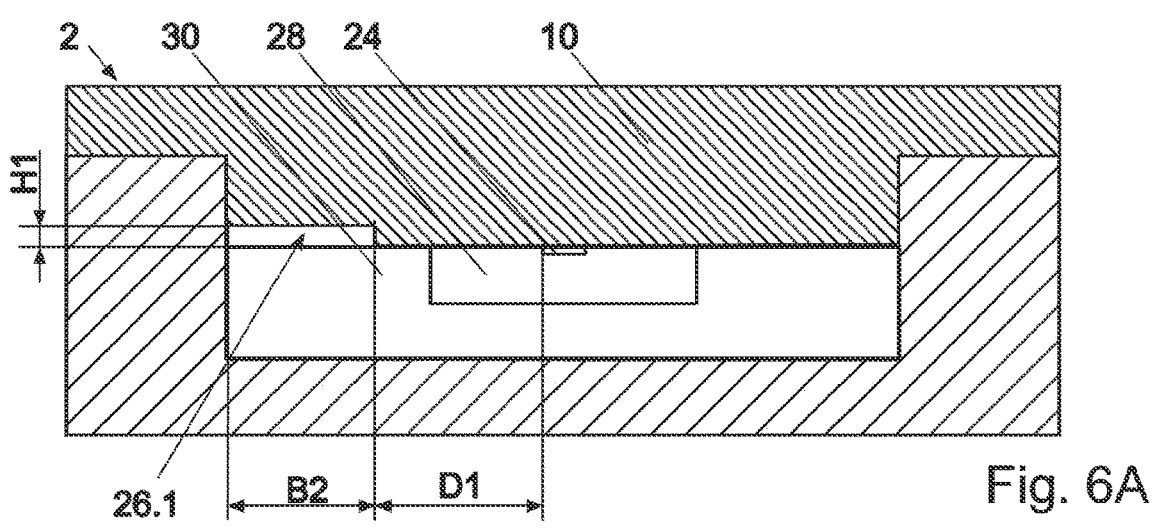
FIG. 6A shows a further embodiment of a cross-section of an air mass sensor incorporating teachings of the present disclosure.
Figure 6B:
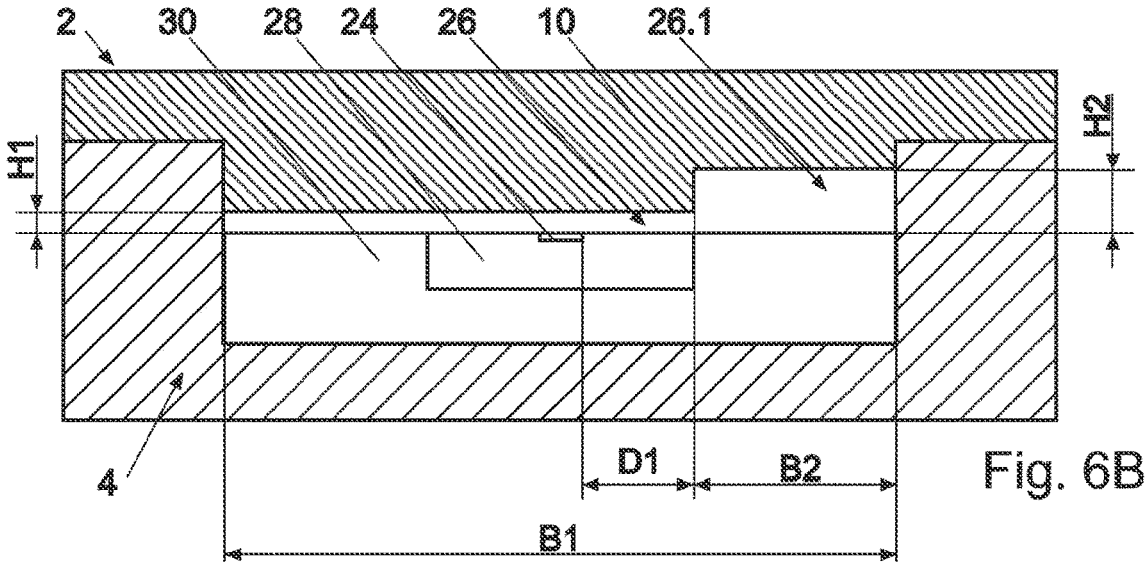
FIG. 6B shows a further embodiment of a cross-section of an air mass sensor incorporating teachings of the present disclosure.
Figure 6C:
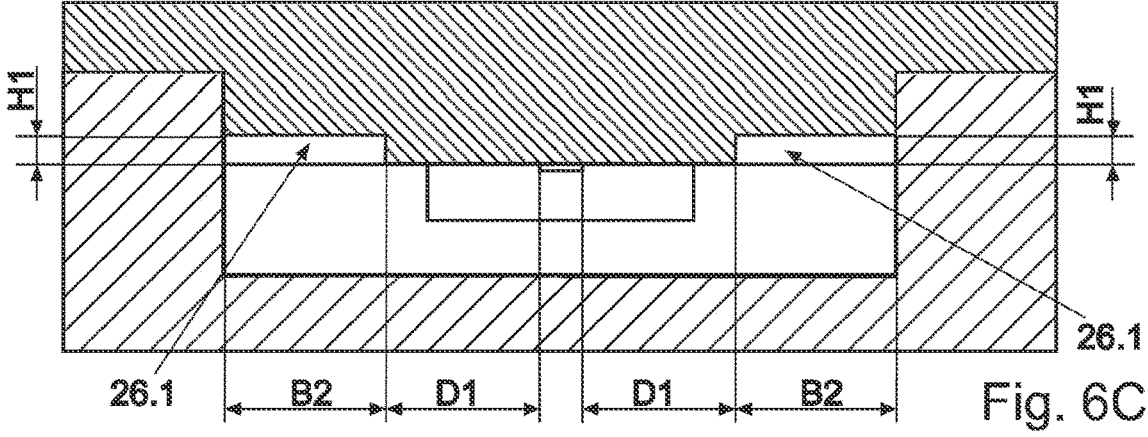
FIG. 6C shows a further embodiment of a cross-section of an air mass sensor incorporating teachings of the present disclosure.

FIGS. 6A, 6B and 6C show further variants for the design of the opening 26, wherein rectangular through-openings 26.1 are shown on their own (FIG. 6A, FIG. 6C) or in combination with a continuous gap. The rectangular through-openings 26.1 have a distance D1 to the measuring element which is smaller than 5 mm.

Figures 7A, 7B, 7C:
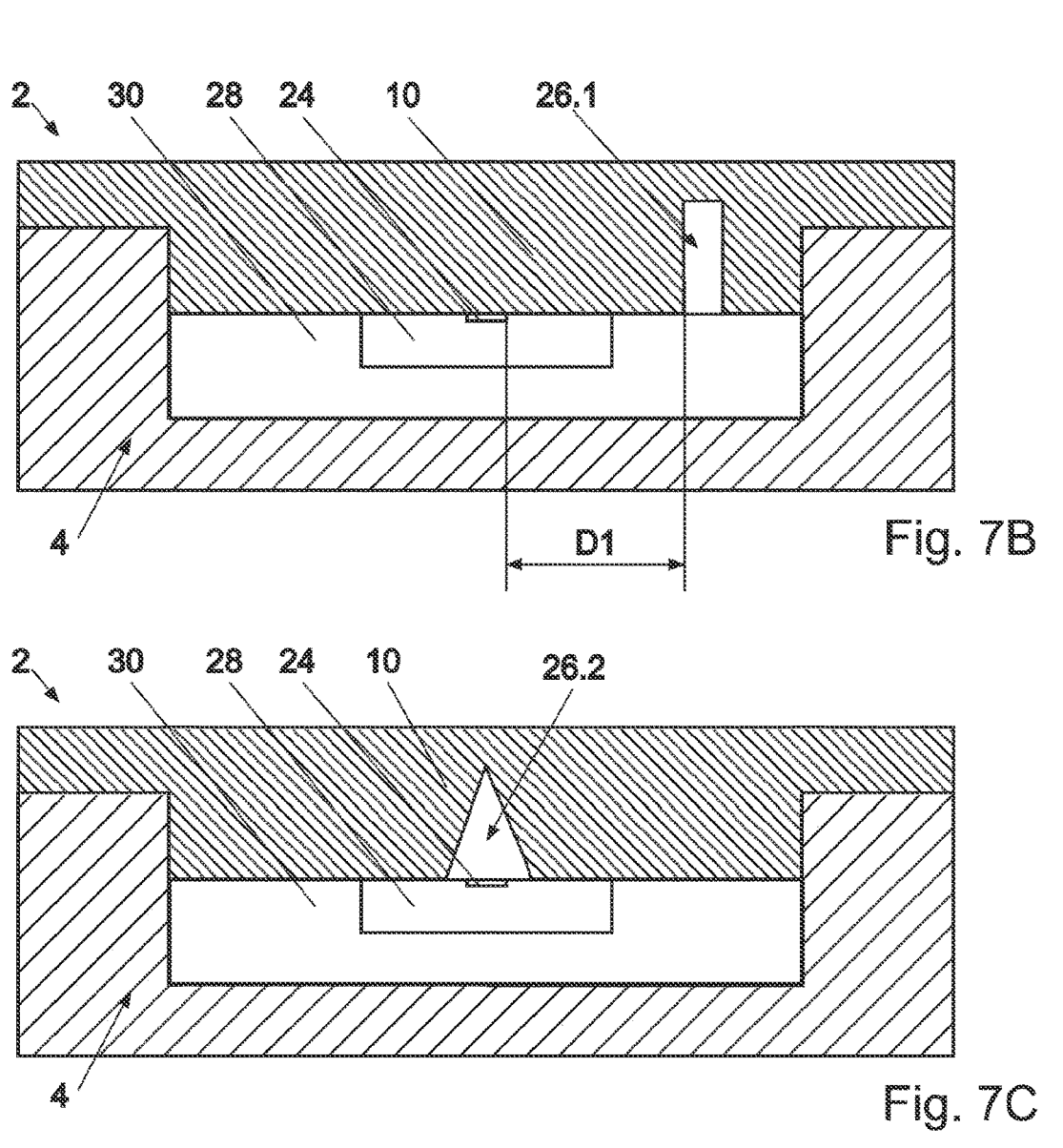
FIG. 7A shows a further embodiment of a cross-section of an air mass sensor incorporating teachings of the present disclosure.
FIG. 7B shows a further embodiment of a cross-section of an air mass sensor incorporating teachings of the present disclosure.
FIG. 7C shows a further embodiment of a cross-section of an air mass sensor incorporating teachings of the present disclosure.

FIGS. 7A, 7B and 7C show further variants for the design of the opening 26, namely in the form of openings 26.1 and 26.2, which can be arranged at the level of the measuring element 24 or upstream of the measuring element 24. The opening 26.1 according to FIG. 7B has a distance D1 to the measuring element which is smaller than 5 mm.

Figures 8A, 8B, 8C:
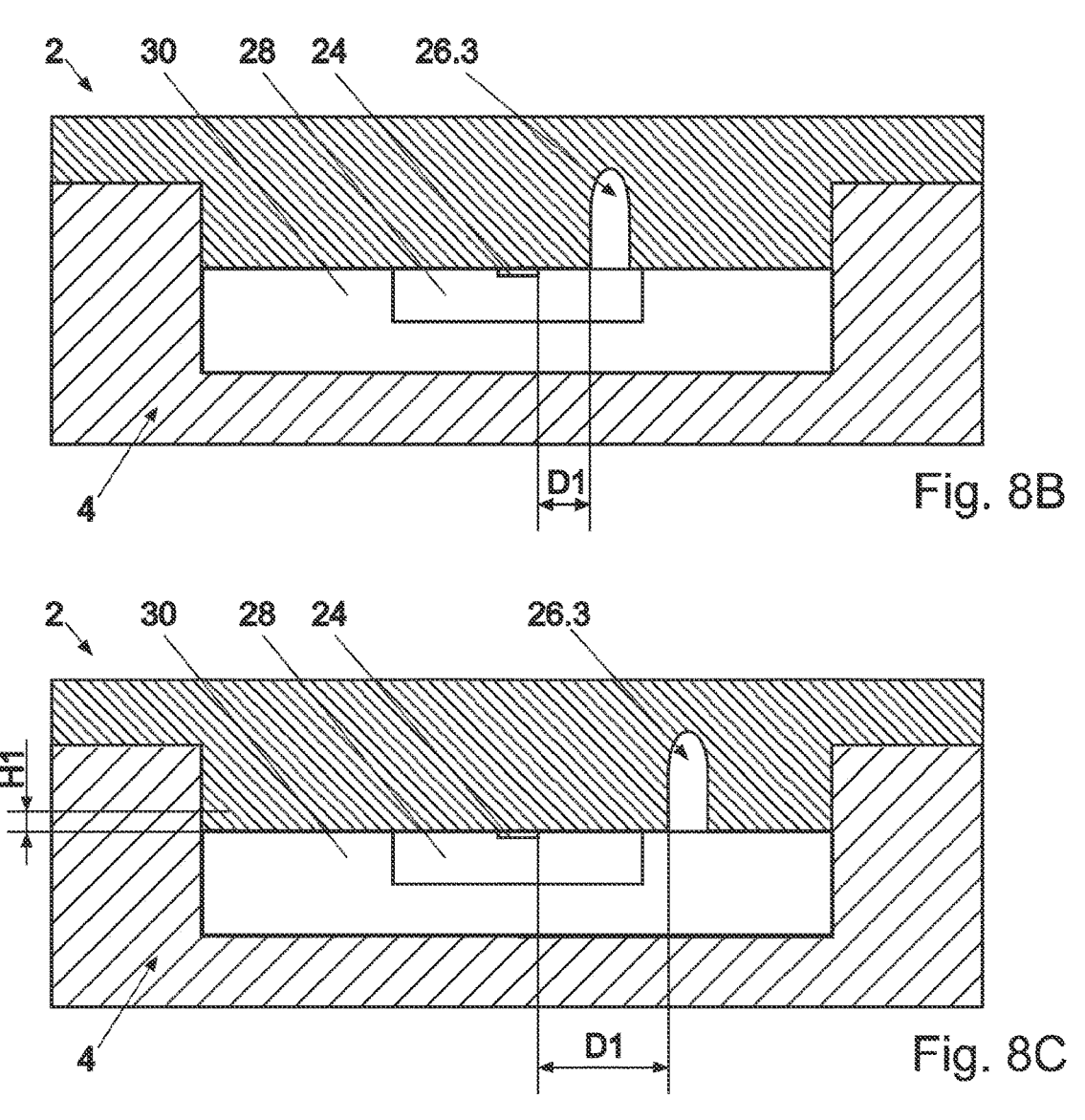
FIG. 8A shows a further embodiment of a cross-section of an air mass sensor incorporating teachings of the present disclosure.
FIG. 8B shows a further embodiment of a cross-section of an air mass sensor incorporating teachings of the present disclosure.
FIG. 8C shows a further embodiment of a cross-section of an air mass sensor incorporating teachings of the present disclosure.

FIGS. 8A, 8B and 8C show further variants for the design of the opening 26, namely in the form of openings 26.3, which can be arranged at the level of the measuring element 24 or upstream of the measuring element 24. The openings 26.3 according to FIGS. 8B and 8C each have a distance D1 to the measuring element 24 that is less than 5 mm.

Figures 9A, 9B, 9C:
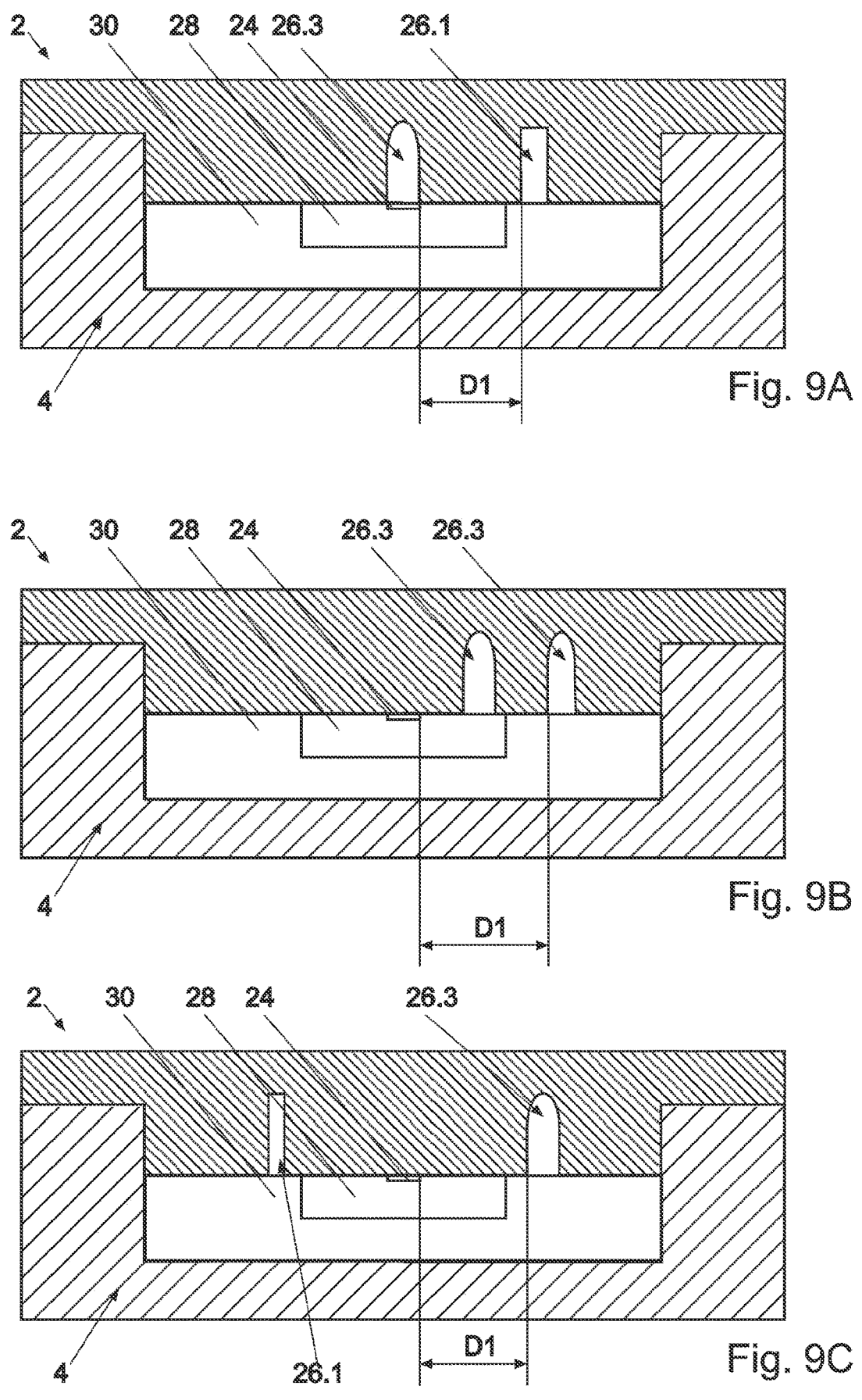

FIGS. 9A, 9B and 9C show further variants for the design of the opening 26, namely in the form of openings 26.1 and 26.3, which can be arranged at the level of the measuring element 24 or upstream or downstream of the measuring element 24. The opening 26.1 according to FIG. 9A and the openings 26.3 and 26.1 according to FIGS. 9B and 9C each have a distance D1 to the measuring element 24 which is less than 5 mm.

It is understood that the variants according to 7A-9C can also be combined with a continuous gap.

A respective air mass sensor 2 is set up to measure the air mass flow and also to measure the pressure, humidity and temperature of the air mass flow.

Figure 10:
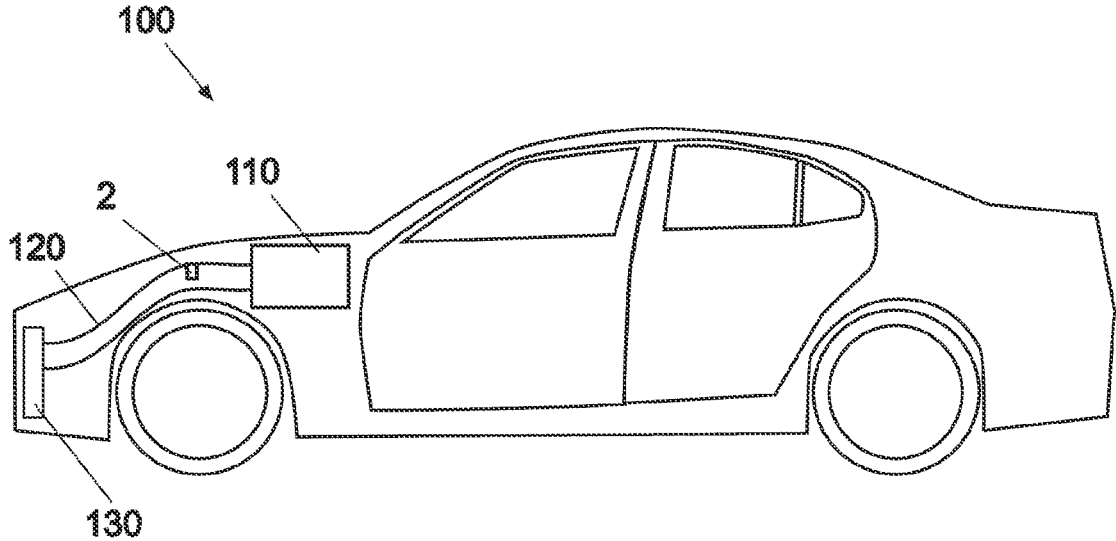
FIG. 10 shows a perspective view from above of a motor vehicle incorporating teachings of the present disclosure.

FIG. 10 shows a motor vehicle 100 incorporating teachings of the present disclosure, with a turbocharged internal combustion engine 110 and with an air mass sensor 2, wherein the air mass sensor 2 is arranged in an intake line 120 of the internal combustion engine 110 to measure an air mass flow within the intake line 120. The intake line 120 is connected to an intercooler 130.

In some embodiments, the motor vehicle 100 can be a hybrid vehicle having at least one electric motor with an associated traction battery in addition to the internal combustion engine 110.

What is claimed is:

1. An air mass sensor for determining an air mass flow rate, the sensor comprising:

a housing defining an electronics chamber; and sensor electronics at least partly located in the electronics chamber;

wherein the housing defines a duct providing passage for a gas to flow through the housing; and the housing defines an opening connecting the duct and the electronics chamber;

wherein the electronics chamber forms a pressure compensation volume for the duct.

2. The air mass sensor as claimed in claim 1, wherein a free volume of the electronics chamber is more than 0.5 cm3 and less than 20 cm3.

3. The air mass sensor as claimed in claim 1, wherein the opening defines a gap with a height between 0.02 mm and 0.3 mm inclusive.

4. The air mass sensor as claimed in claim 1, wherein the opening has, at least in portions, a polygonal cross-section, and/or at least in portions, a circular or arcuate cross-section.

5. The air mass sensor as claimed in claim 1, wherein:

the opening has, at least in portions, a height between 0.02 mm and 3 mm inclusive; and/or the opening has, at least in portions, a width between 0.5 mm and 10 mm inclusive.

6. The air mass sensor as claimed in claim 1, wherein the air mass sensor measures one or more of:

pressure of the air mass flow, humidity of the air mass flow, and temperature of the air mass flow.

7. The air mass sensor as claimed in claim 1, wherein a measuring element of the sensor electronics comprises a thermal measuring element.

8. The air mass sensor as claimed in claim 7, wherein: the opening is arranged at least in portions downstream of a measuring element of the sensor electronics, the opening is arranged at least in portions upstream of a measuring element of the sensor electronics, and/or the opening is arranged at least in portions at the level of a measuring element of the sensor electronics.

9. The air mass sensor as claimed in claim 1, wherein:

the opening is set at a distance to a measuring element (24) of the sensor electronics less than 10 mm;

the opening has a height greater than a width and is set at a distance to the measuring element less than 10 mm; and/or the opening has a height greater than a width and is set at a distance to the measuring element at most ten times the width of the opening.

10. A motor vehicle comprising:

an air flow path; and an air mass sensor for determining an air mass flow rate passing through the air flow path, the sensor comprising:

a housing defining an electronics chamber; and sensor electronics at least partly located in the electronics chamber;

wherein the housing defines a duct providing passage for a gas to flow through the housing; and the housing defines an opening connecting the duct and the electronics chamber;

wherein the electronics chamber forms a pressure compensation volume for the duct.

11. The motor vehicle as claimed in claim 10, further comprising an internal combustion engine;

wherein the air flow path includes an intake line of the internal combustion engine.

* * * * *